United States Patent
Tages

(10) Patent No.: US 9,287,917 B1
(45) Date of Patent: Mar. 15, 2016

(54) ELECTRONIC DEVICE PROTECTIVE CASE WITH CONVENIENCE FEATURES

(71) Applicant: A.G. Findings & Mfg. Co., Sunrise, FL (US)

(72) Inventor: Fernando Tages, Coral Springs, FL (US)

(73) Assignee: A.G. Findings & Mfg. Co., Sunrise, FL (US)

( * ) Notice: Subject to any disclaimer, the term of this patent is extended or adjusted under 35 U.S.C. 154(b) by 0 days.

(21) Appl. No.: 14/626,406

(22) Filed: Feb. 19, 2015

(51) Int. Cl.
*H04M 1/00* (2006.01)
*H04B 1/3888* (2015.01)
*H04B 1/3877* (2015.01)
*A45C 11/00* (2006.01)

(52) U.S. Cl.
CPC ............ *H04B 1/3888* (2013.01); *H04B 1/3877* (2013.01); *A45C 2011/002* (2013.01)

(58) Field of Classification Search
USPC .............. 455/575.1, 575.8, 90.3; 379/433.01, 379/433.11, 433.13
See application file for complete search history.

(56) References Cited

U.S. PATENT DOCUMENTS

| | | | | |
|---|---|---|---|---|
| 5,100,098 A * | 3/1992 | Hawkins | ............... | F16M 11/041 16/339 |
| 7,324,642 B2 * | 1/2008 | Pletikosa | ............... | G06F 1/1626 361/679.27 |
| 7,708,240 B2 * | 5/2010 | Homer | .................. | G06F 1/1601 248/130 |
| 8,230,992 B2 * | 7/2012 | Law | ...................... | G06F 1/1626 206/320 |
| 8,619,416 B2 * | 12/2013 | Lim | ...................... | G06F 1/1632 361/679.41 |
| 8,708,140 B2 * | 4/2014 | Liu | ......................... | A45C 11/00 206/320 |
| 8,720,843 B1 * | 5/2014 | Chen | ..................... | G06F 1/1613 206/305 |
| 8,730,667 B2 * | 5/2014 | Kaneko | .................. | A45C 11/00 206/320 |
| 8,743,538 B2 * | 6/2014 | Ashcraft | ............... | G06F 1/1615 361/679.27 |
| 8,783,458 B2 * | 7/2014 | Gallagher | ............ | F16M 11/105 206/320 |
| 9,095,194 B2 * | 8/2015 | Hassett | .................... | A45C 11/00 |
| 9,118,390 B2 * | 8/2015 | Lin | ...................... | H04B 1/3888 |
| 9,170,611 B2 * | 10/2015 | Gallagher | ............. | G06F 1/1633 |
| 2013/0083953 A1 * | 4/2013 | Chang | ................... | G06F 1/1628 381/333 |
| 2014/0063715 A1 * | 3/2014 | Hwang | ................. | G06F 1/1632 361/679.15 |
| 2014/0200056 A1 * | 7/2014 | Liu | ...................... | H04B 1/3877 455/575.8 |

* cited by examiner

*Primary Examiner* — Tuan A Tran
(74) *Attorney, Agent, or Firm* — Christopher & Weisberg, P.A.

(57) ABSTRACT

A mobile electronic device case for protecting and securing a mobile electronic device in multiple positions. The case having a base for retaining a mobile electronic device, a cover for enclosing the mobile electronic device, and dual hinge linkage to allow pivotal rotation of the base and cover. The cover and base are affixed to the dual hinge linkage which allows the cover and base to rotate and secure into multiple positions including the closed position, the upright seated position, and the hand-held carry position. The dual hinge linkage is also used to provide increased stability and added protection. A flexible and adjustable strap is mounted within a recess on the outside surface of the cover and allows a user to hold the case in one hand while using the device with the other hand in the hand-held carry position.

20 Claims, 9 Drawing Sheets

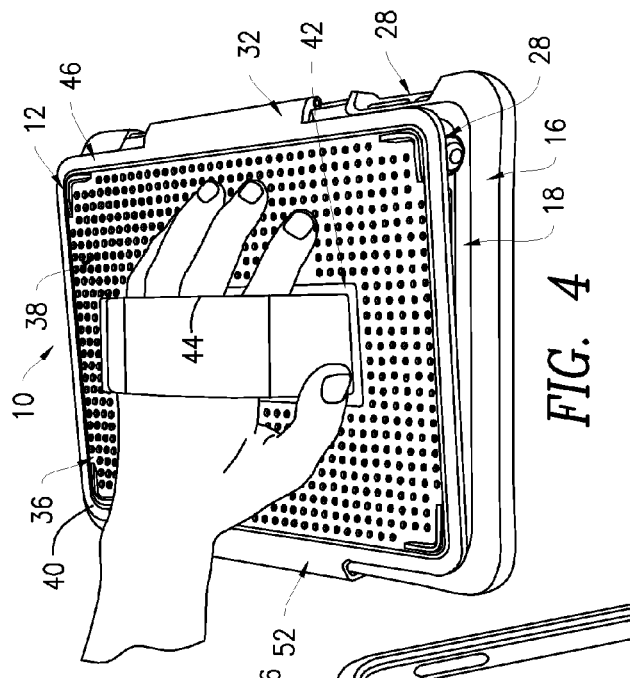
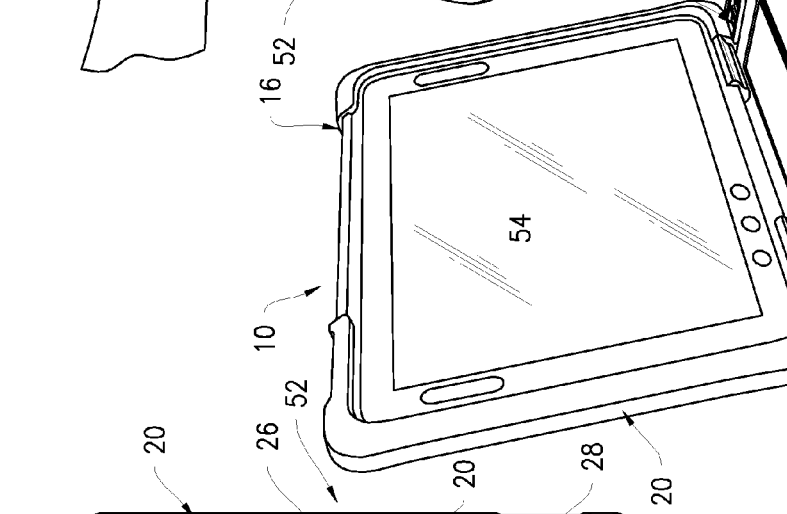
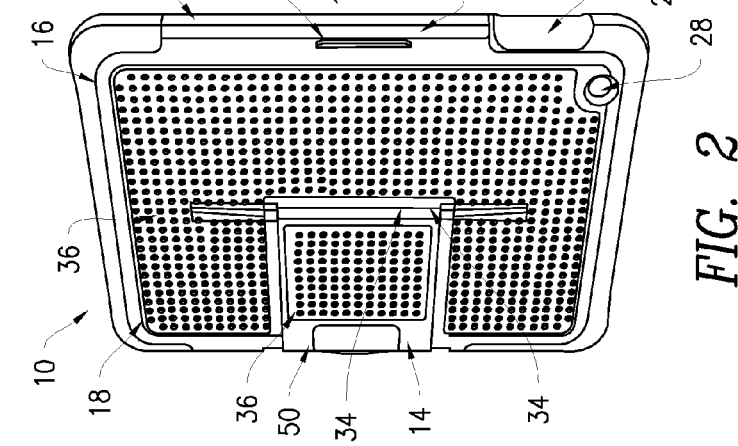

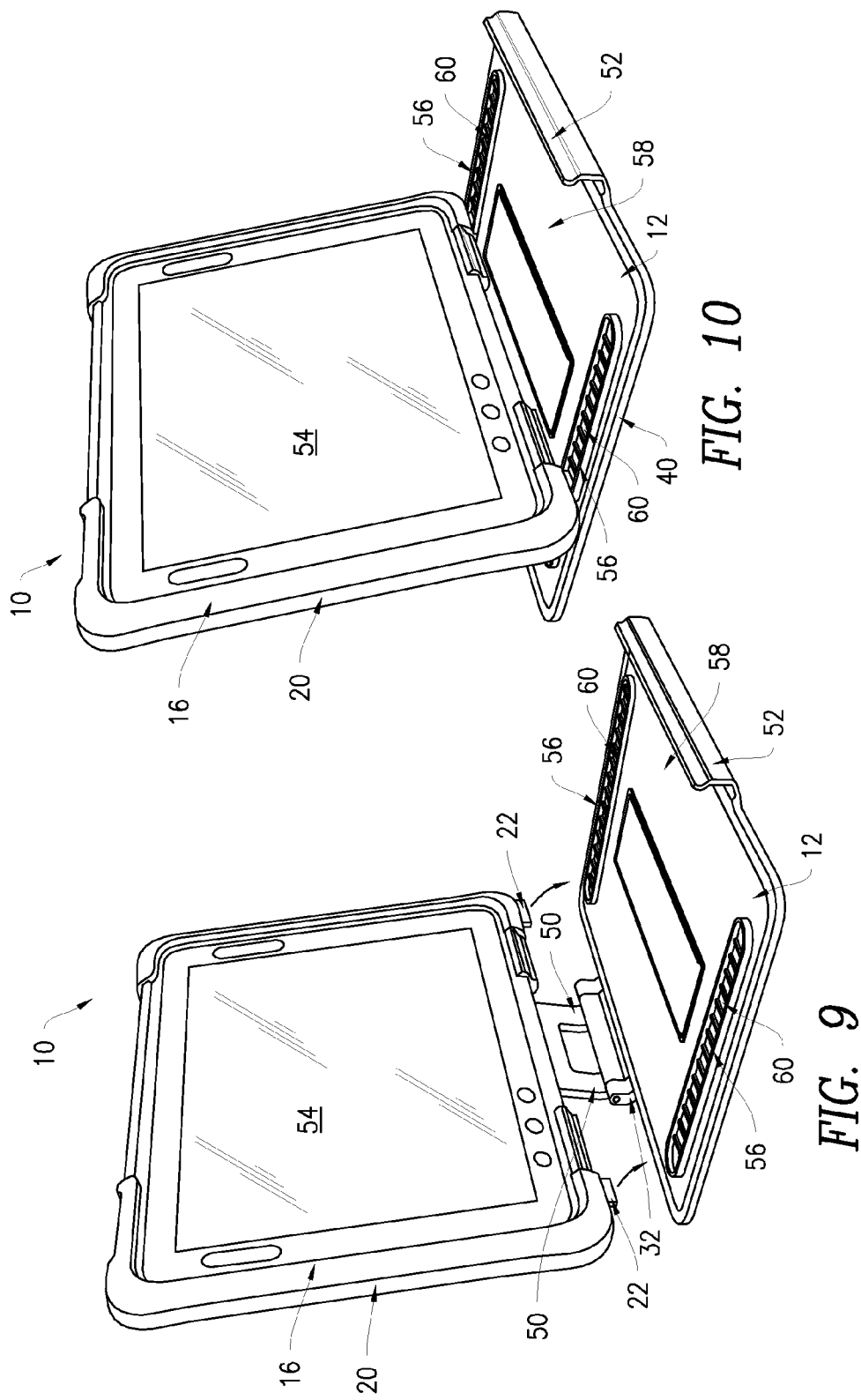

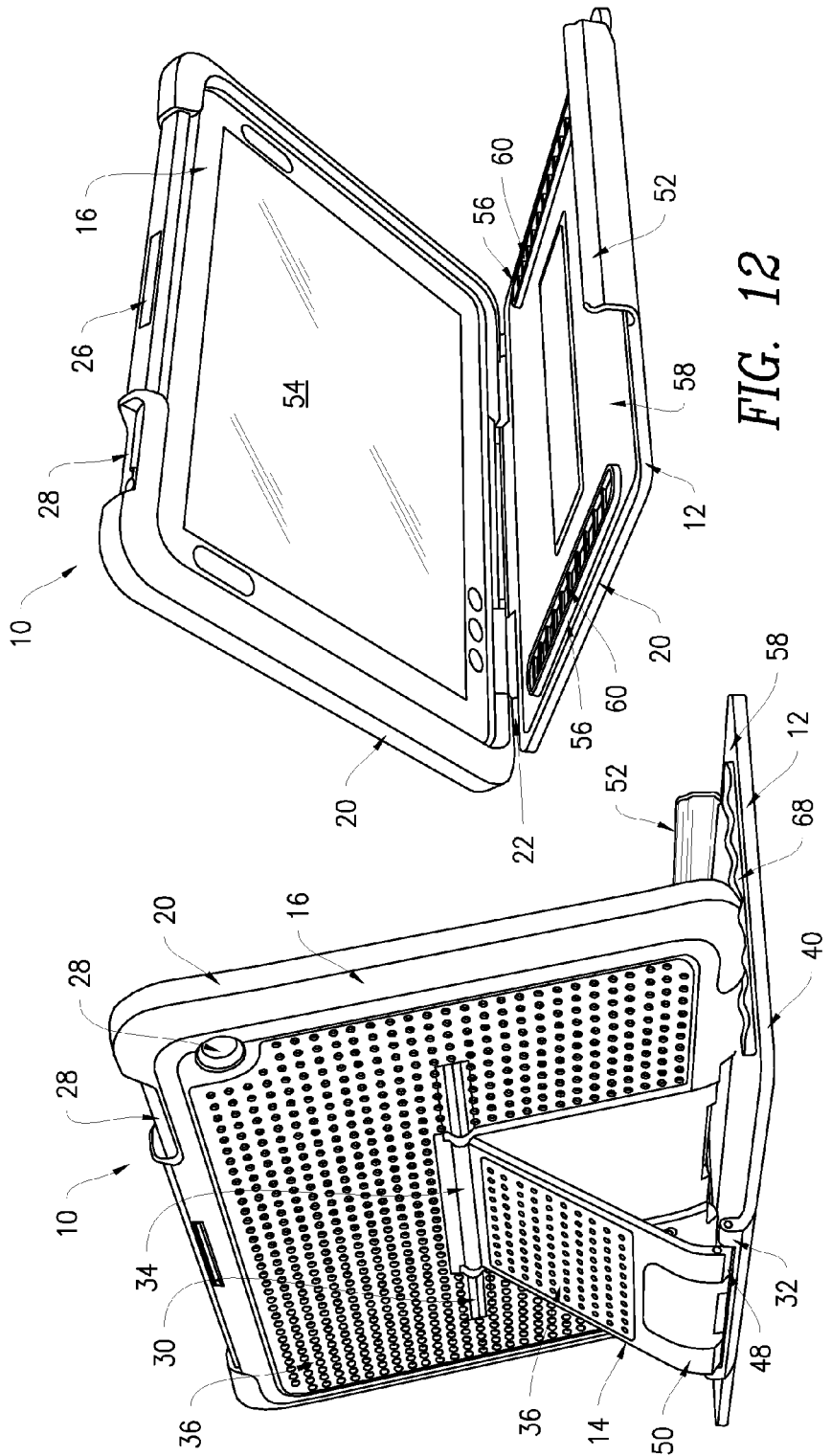

ELECTRONIC DEVICE PROTECTIVE CASE WITH CONVENIENCE FEATURES

CROSS-REFERENCE TO RELATED APPLICATION n/a

STATEMENT REGARDING FEDERALLY SPONSORED RESEARCH OR DEVELOPMENT n/a

TECHNICAL FIELD

This application is directed to a case for a mobile electronic device.

BACKGROUND OF THE INVENTION

As mobile electronic devices become more technologically advanced and include more features, use of the devices is more widespread. Accordingly, protective cases designed to prevent device damage or breakage are in higher demand, but existing cases lack many desirable features.

In particular, elastic and resilient materials that absorb impact forces ("soft cases") and fracture-resistant plastics ("hard cases") have been used in protective cases to reduce the impact force on mobile electronic devices. The resultant protective cases often suffer from numerous limitations as well as a low quality user experience. For example, cases exclusively composed of high durometer plastics, or similarly hard materials, often include jagged or sharp corners. The jagged or sharp corners can cause discomfort in the user's hand. Also, high durometer plastic cases, while lending overall durability to the protective case, can rupture at connection points thereby leaving the mobile electronic device unprotected and exposed.

Conversely, soft resilient cases such as those made from rubber or other elastomeric materials, while providing impact protection, are often large and unwieldy thereby mitigating the benefits of having a slim profile mobile electronic device. Further, rubber and other elastomeric materials have high coefficients of friction which can cause cases to adhere to various surfaces and make it difficult to easily move the case off a particular surface. Consumers often remove these bulky and unwieldy cases leaving the mobile electronic device unprotected and vulnerable.

In addition, although some soft cases provide a viewing platform for supporting and positioning a tablet at different angles, the viewing platform is an accessory component separate from the protective portion of the case. Conventional cases for mobile electronic devices lack multiple integrated convenience features that enhance the user's experience.

SUMMARY

The present invention advantageously provides a case for holding a mobile electronic device having a base configured to releasably retain the mobile electronic device, a cover, and a dual hinge linkage. The dual hinge linkage includes a first-end link body pivotably coupled to the base and a second-end link body pivotably coupled to the cover. The dual hinge linkage is configured to allow movement of the base with respect to the cover between a closed position, an upright seated position and a hand-held carry position.

In accordance with another embodiment of the present invention, the case for holding a mobile electronic device has a cover, a base and a dual hinge linkage. The cover has a first-end link body, a first substantially planar cover surface, a second substantially planar cover surface opposite the first substantially planar cover surface and a plurality of substantially linear cover sidewall portions that define a perimeter around the first substantially planar cover surface and the second substantially planar cover surface. The base is configured to releasably retain the mobile electronic device and has a first planar base surface opposite the second planar base surface and a second-end link body. The dual hinge linkage has a first mating element pivotally coupled to the first-end link body. The dual hinge linkage also has a second mating element pivotally coupled to the second-end link body. The dual hinge linkage is configured to allow movement of the base with respect to the cover to facilitate positioning of the case between a closed potion, an upright seated position and a hand-held carry position.

In accordance with another embodiment of the present invention, a case for holding a mobile electronic device has a cover, a base and a dual hinge linkage. The cover has at least one track with at least one stop and a first-end link body that includes an upper edge. The base is configured to releasably retain the mobile electronic device and has a second-end link body. The base is configured to engage with the at least one stop on the cover when the base is in the upright seated position. The dual hinge linkage includes a first mating element and a second mating element. The first mating element may be connected to the upper edge of the first-end link body on the cover. The first mating element may be pivotally coupled to the first-end link body and the second mating element may be pivotally coupled to the second-end link body. The first mating element and the second mating element may each be arranged to allow movement of the base with respect to the cover such that the base and the cover are transitionable between a closed position, an upright seated position and a hand-held carry position.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 2 is a rear perspective view of the mobile electronic device protective case shown in a closed position;

FIG. 3 is a front perspective view of the mobile electronic device protective case shown in an upright seated position;

FIG. 4 is a rear perspective view of the mobile electronic device case just before the case is locked into the hand-held carry position;

FIG. 9 is a front perspective view of the mobile electronic device retained in the protective case transitioning into the upright seated position;

FIG. 10 is a front perspective view of the mobile electronic device retained in the mobile electronic device protective case in the upright seated position;

FIG. 11 is a rear perspective view of the mobile electronic device protective case with the case in the upright seated position;

FIG. 12 is a front perspective view of the mobile electronic device protective case transitioning from the upright seated position into the closed position;

DETAILED DESCRIPTION

Figure 1:
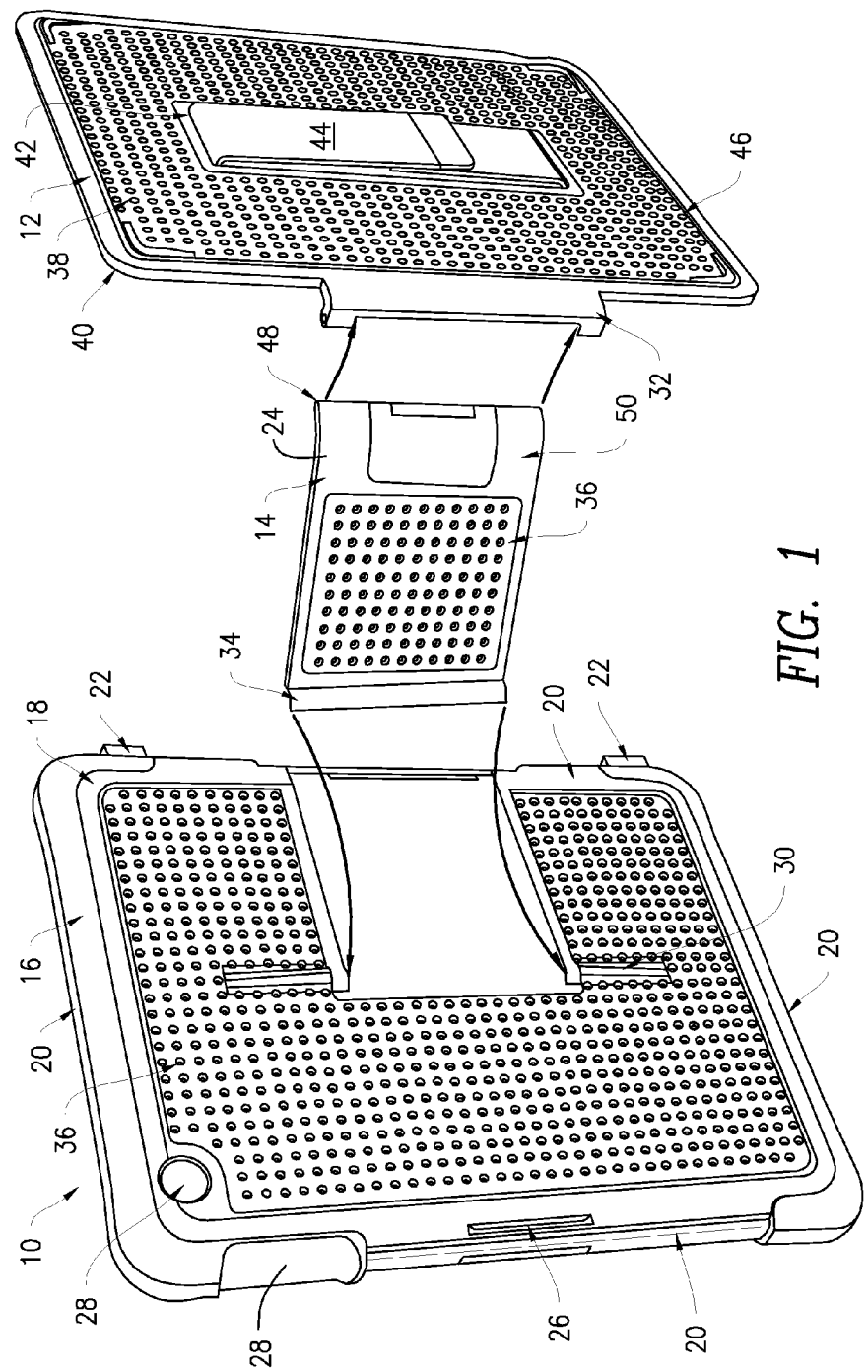
FIG. 1 is an exploded rear perspective view of a mobile electronic device protective case with integrated convenience features in accordance with the principles of the present invention.

Now referring to the drawing figures in which like reference designators refer to like elements, there is shown in FIG. 1 a mobile electronic device case constructed in accordance with the principles of the present invention and designated generally as "10." The case 10 includes a cover 12, dual hinge linkage 14, and a base 16 sized to receive and at least partially enclose the mobile electronic device when retained in the base 16.

The dimensions of the base 16 may be pre-fabricated to contour a specific mobile electronic device (shown as electronic device 54 in FIG. 3) and therefore may vary depending on the size of the mobile electronic device 54. The base 16 may include a first planar base surface 18 affixed to and substantially perpendicular to a plurality of base sidewall portions 20. The first planar base surface 18 and the plurality of base sidewalls portions 20 may be composed of a first material and may further define a length, width, and height commensurate with the dimensions of a mobile electronic device 54 and may operate to receive and retain the mobile electronic device 54 in a closed position, an upright seated position, or a hand-held carry position. The first material may include a substantially rigid material, for example, polycarbonate (PC), or a similarly rigid material having a comparable durometer hardness. The base 16 may further include a plurality of support tabs 22 disposed along a base sidewall portion 20. The support tabs 22 may be composed of the first material, may be rectangular or square in shape, and may be substantially shorter in length than the mobile electronic device. Further, the support tabs 22 may extend outwardly and may project away from and in substantially perpendicular orientation to the plurality of base sidewall portions 20. The support tabs 22 may be substantially angled and, as discussed below, operate to secure the base 16 to the cover 12 in the upright seated position. The cover 12 may be pivotally connected to the base 16 to allow at least a 90 degree angle when the base 16 is in the upright seated position.

The base 16 may also include at least a recessed edge 26 disposed within a base sidewall portion 20. In one embodiment, the recessed edge 26 may be located around the upper edge 27 of the first planar base surface 18. The recessed edge 26 may be substantially rectangular or square in shape, and shorter in length than the length of the corresponding base sidewall portion 20. Further, the recessed edge 26 may be substantially perpendicular with the plurality of base sidewall portions 20. The recessed edge 26 may operate the female part of a lock to secure the base 16 to the cover 12 and may also provide additional structural support to the case 10 in the closed position.

The base 16 may further define a plurality of apertures 28. The apertures 28 may be cut-out from the first material of the base 16 in a shape and sized to accommodate the push-buttons on the mobile electronic device to allow a user to actuate the push-buttons, to allow an unimpeded view for an image capturing device on the mobile electronic device and to insert a headphone plug into a corresponding jack on the mobile electronic device. The base 16 may have one aperture 28 to allow access to at least a portion of the mobile electronic device 54.

The base 16 may include a second-end link body 30. The second-end link body 30 may be affixed to the midpoint of the first planar base surface 18 and may be composed of the first material. It is contemplated that the second-end link body 30 may be positioned anywhere on the base 16 so that the dual hinge linkage 14 may operate to connect the cover 12 and the base 16 while also permitting the pivotal rotation of the cover 12 and the base 16 into multiple positions. The cover 12 and the base 16 may be affixed to the dual hinge linkage 14 to allow pivotal rotation into the closed position and the hand-held carry position. Further, the second-end link body 30 may be releasably attached to the second mating element 34 of the dual hinge linkage 14. The second mating element 34 of the dual hinge linkage 14 may be pivotally affixed at approximately a midpoint of the base 16. The second-end link body 30 may contain an embedded rotational device, for example, an axle to enable the base 16 to pivotally rotate into multiple positions.

The base 16 may further define a second layer of material 36 molded or affixed to the first planar base surface 18. The second layer of material 36 may be at least partially composed of a substantially elastic durable material, for example, polyurethane (PU) or similarly flexible material having a high coefficient of friction (2-3μ). The second layer of material 36 may be patterned, for example with stippling, substantially commensurate to the dimensions of the base 16, and designed to protect the base 16 from inadvertent impact or sliding.

The cover 12 includes a first at least substantially planar cover surface 38 connected to and substantially perpendicular to a plurality of cover sidewall portions 40. Each of the plurality of cover sidewall portions 40 defines a length, width, and height substantially commensurate with the dimensions of a mobile electronic device 54. The cover 12 and the base 16 may be pivotally rotated via the dual hinge linkage 14 to enclose the mobile electronic device 54 in the closed position and to also provide impact absorption for the mobile electronic device 54. The cover 12 may include a recess 42 that can be molded into the first at least substantially planar cover surface 38. In one embodiment, the cover 12 may include a recess 42 that may be molded into the midpoint of the first at least substantially planar cover surface 38 as discussed in more detail in FIG. 6 below. The recess 42 is arranged to receive and retain an adjustable strap 44. The adjustable strap 44 may be at least partially composed of a flexible material, for example, rubber or a similar fiber that stretches to the varying shape and contour of the user's hand. Additionally, the adjustable strap 44 may also contain an adjustable fastener. The adjustable strap 44 functions to allow the user to securely hold the case 10 in one hand, and operate the mobile electronic device 54 with the other hand. The adjustable strap 44 may be accessible when the mobile electronic device case 10 is in the hand-held carry position.

The cover 12 may also include a first-end link body 32 affixed to and substantially perpendicular to one of the plurality of cover sidewall portions 40. The first-end link body 32 may be commensurate with the length of the dual hinge linkage 14 and may be composed of the first material molded as part of the cover. Further, the first-end link body 32 may contain an embedded rotational device, for example, an axle which operates to enable the cover 12 to pivotally rotate into multiple positions such as the closed position, the upright seated position, and the hand-held carry position. In one embodiment, the cover 12 may include a first layer of cover material 46 molded or affixed to the first at least substantially planar cover surface 38. The first layer of cover material 46 may be at least partially composed of a substantially elastic durable material, for example, polyurethane (PU), or similarly flexible material with a high coefficient of friction (2-3µ). Additionally, the first layer of cover material 46 may also be at least partially composed of the same material as the second layer of material 36. The first layer of cover material 46 may be any shape and may include at least one design or pattern. In one embodiment, the first layer of cover material 46 may be substantially rectangular or circular in shape, and substantially commensurate to the dimensions of the cover 12 and may include a plurality of designs or patterns which operate to protect the cover 12 from inadvertent impact and sliding.

The dual hinge linkage 14 may be releasably attached to the cover 12 and the base 16 at the first mating element 48 and the second mating element 34 respectively. The first mating element 48 may be pivotally coupled to the first-end link body 32. The first-end link body 32 may include an upper edge 33. The first mating element 48 may be connected to the upper edge 33 of the first-end link body 32. The second mating element 34 may be pivotally coupled to the second-end link body 30. In one embodiment, the dual hinge linkage 14 may have the first mating element 48 configured to fit into the first-end link body 32 and the second mating element 34 configured to fit into the second-end link body 30 where the second-end link body 30 allows pivotal rotation of the cover 12 about the base 16. The cover 12 may include the first-end link body 32 and the first mating element 48 of the dual hinge linkage 14 being be pivotally affixed to the first-end link body 32. The first mating element 48 and the second mating element 34 may be arranged to allow movement of the base 16 with respect to the cover 12 so that the base 16 and the cover 12 are transitionable between a closed position, an upright seated position and a hand-held carry position.

The dual hinge linkage 14 can be in any shape designed to fit within corresponding recesses and is also designed to rotate into different positions. In one embodiment, the dual hinge linkage 14 may be substantially rectangular or square shaped, composed of the first material, and commensurate to the length of the first-end link body 32. The dual hinge linkage 14 rotatably connects the cover 12 and the base 16 by permitting the pivotal rotation of the cover 12 and the base 16 into the closed position, the upright seated position, and the hand-held carry position. The dual hinge linkage 14 may include the second layer of material 36 molded or affixed to the second planar surface of the dual hinge linkage 50. The second layer of material 36 may be substantially commensurate to the dimensions of the dual hinge linkage 14 and designed to further protect the dual hinge linkage 14 from inadvertent impact or sliding.

Now referring to FIG. 2, where the base 16 of the mobile electronic device case can be seen in a closed position, the base 16 and the dual hinge linkage 14 may be shifted from the closed position to the upright seated position or the hand-held carry position by releasing a locking latch 52. When the base 16 is in the closed position, the base 16 and the cover 12 may be substantially parallel to one another and securely releasably engaged to each other. The locking latch 52 may be composed of the first material and may be substantially rectangular or squared shaped, and shorter in length than the mobile electronic device. The locking latch 52 may be affixed to and substantially parallel with the plurality of first base sidewall portions 20. Further, the locking latch 52 may contain a substantially concave curvature about the midpoint sized to releasably engage the recessed edge 26 and to provide a locking mechanism for the cover 12 when in the closed position. When the mobile electronic device case 10 is in the closed position, the dual hinge linkage 14 is rotated so that the base 16 rotates until the surface of the mobile electronic device 54 is lying horizontally on top of the second at least substantially planar cover surface 58 thereby allowing the locking latch 52 to secure to the recessed edge 26. When the mobile electronic device case 10 is in the closed position, the substantially linear base sidewall portion 20 may have a locking latch 52 engaged with the recessed edge 26. The cover sidewall portions 40 may be substantially linear and define a perimeter around the first substantially planar cover surface 38 and the second substantially planar cover surface 58.

Now referring to FIG. 3, where the mobile electronic device case 10 is shown holding a mobile electronic device 54 in the upright seated position, the mobile electronic device 54 may be received and retained in the base 16. The base 16 and support tabs 22 may be seated within the plurality of tracks 56 affixed to the second at least substantially planar cover surface 58 as discussed in greater detail in FIGS. 9-10. The second at least substantially planar cover surface 58 may be opposite the first at least substantially planar cover surface 38. The second at least substantially planar cover surface 58 may further include a plurality of tracks 56 affixed to and substantially perpendicular with the second at least substantially planar cover surface 58. The plurality of tracks 56 may be composed of the first material and may be substantially rectangular in shape. Further, the plurality of tracks 56 may have a length that is less than the length of the mobile electronic device 54 but still operable to provide a stable foundation for the case 10 in the upright seated position. A plurality of stops 60 may be molded or affixed to the plurality of tracks 56 on the second at least substantially planar cover surface 58. Each of the stops 60 may be composed of a first material and may be commensurate in length, width, and height to the dimensions of the support tabs 22 while further operating to secure the base 16 to the cover 12 in the upright seated position. The cover 12 may releasably retain the base 16 in the upright seated position by at least one of the plurality of stops 60. The base 16 may be configured to engage with at least one stop 60 from the cover 12 when the base 16 is in the upright seated position. Two adjacent stops 60 define a slot there between. In one embodiment, the plurality of stops 60 can be arranged in two substantially parallel and spaced apart tracks. The cover 12 may relesably retain the base 16 in the upright seated position with at least one stop 60 on a first track 56 of the spaced apart tracks 56 and within at least one stop 60 on a second track 56 of the spaced apart tracks 56. The user can secure the case in the upright seated position which allows the user the ability to adjust the viewing angle of the base 16 to a variety of desired angles while the case 10 is secure. More specifically, the support tabs 22 may be seated in any of the stops 60 within the plurality of tracks 56 so that the mobile electronic device 54 is in a desired position and angle.

Now referring to FIG. 4, where the case is shown just before the mobile electronic device case 10 is locked into the hand-held carry position. The cover 12 may be secured to the base 16 when the locking latch 52 is secured to the recessed edge 26.

Figure 5:
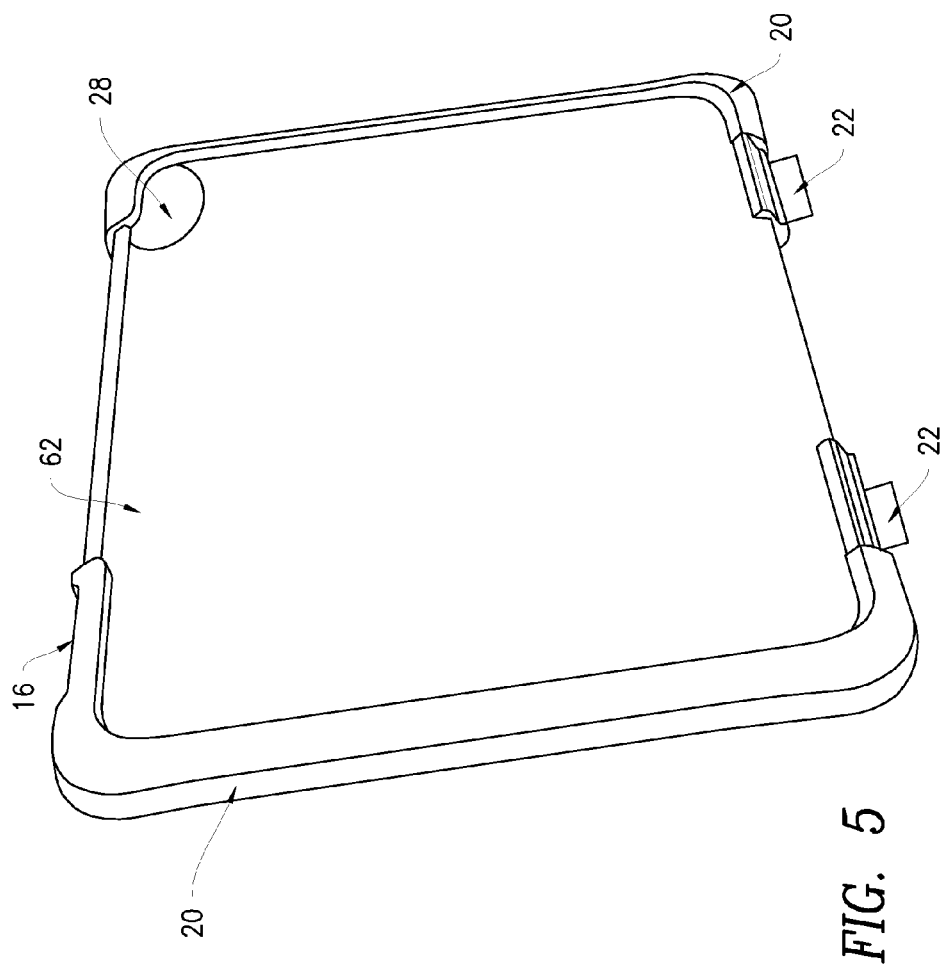
FIG. 5 is a front perspective view of the base of the mobile electronic device protective case.

Now referring to FIG. 5, where the base 16 of the case is shown, the mobile electronic device 54 may be received and releasably retained within the plurality of base sidewall portions 20 which are affixed to and substantially perpendicular with the second planar base surface 62. The second planar base surface 62 may be opposite the first planar base surface 18. The second planar base surface 62 may be substantially composed of the first material and may be commensurate with the dimensions of the mobile electronic device 54. Further, the second i.e. inner planar base surface 62, provides structural integrity to the base 16 as well as cushioning against an inadvertent impact to the mobile electronic device 54.

Figure 7:
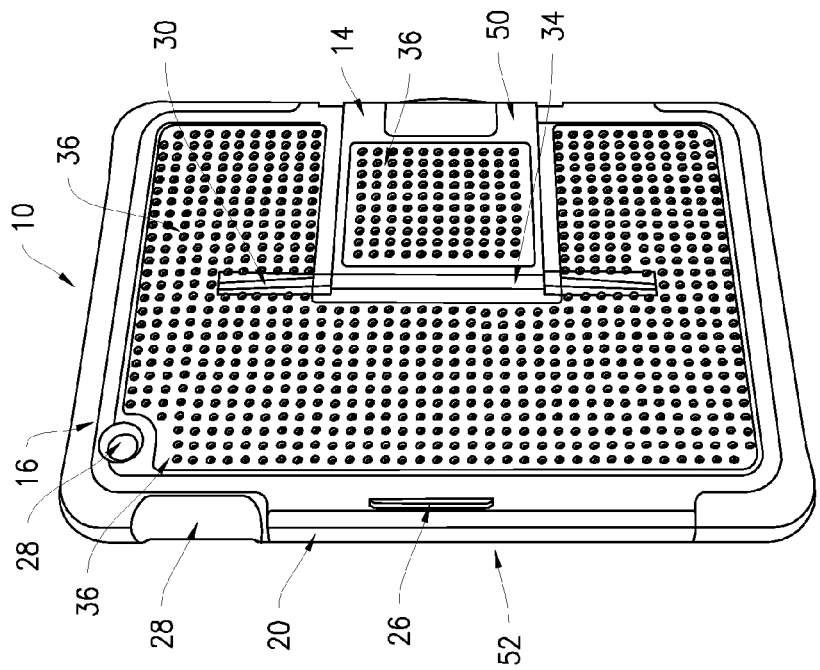
FIG. 7 is a perspective view of the mobile electronic device protective case showing the rear side of the base in the closed position.
Figure 6:
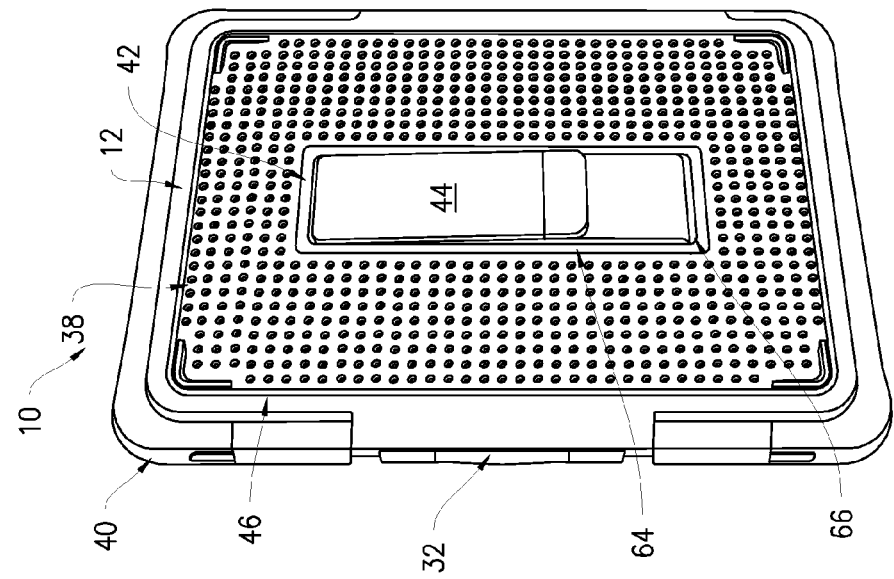
FIG. 6 is a perspective view of the mobile electronic device case showing the rear side of the cover in the closed position.

Now referring to FIGS. 6-7, where a perspective view of the mobile electronic device case showing the rear side of the cover 12 and the rear side of the base 16 in the closed position is shown, there is a recess 42 on the cover 12 which may be molded within first at least substantially planar cover surface 38. The recess 42 may be defined by a plurality of third sidewall portions 64 affixed to and substantially parallel with the third planar cover surface 66. The plurality of third sidewall portions 64 and the third planar cover surface 66 may be composed of the first material, and may be commensurate with the dimensions of the adjustable strap 44. Further, the recess 42 may ensure that the adjustable strap 44 is at least substantially planar to the first at least substantially planar cover surface 38 in the upright seated position.

Figure 8:
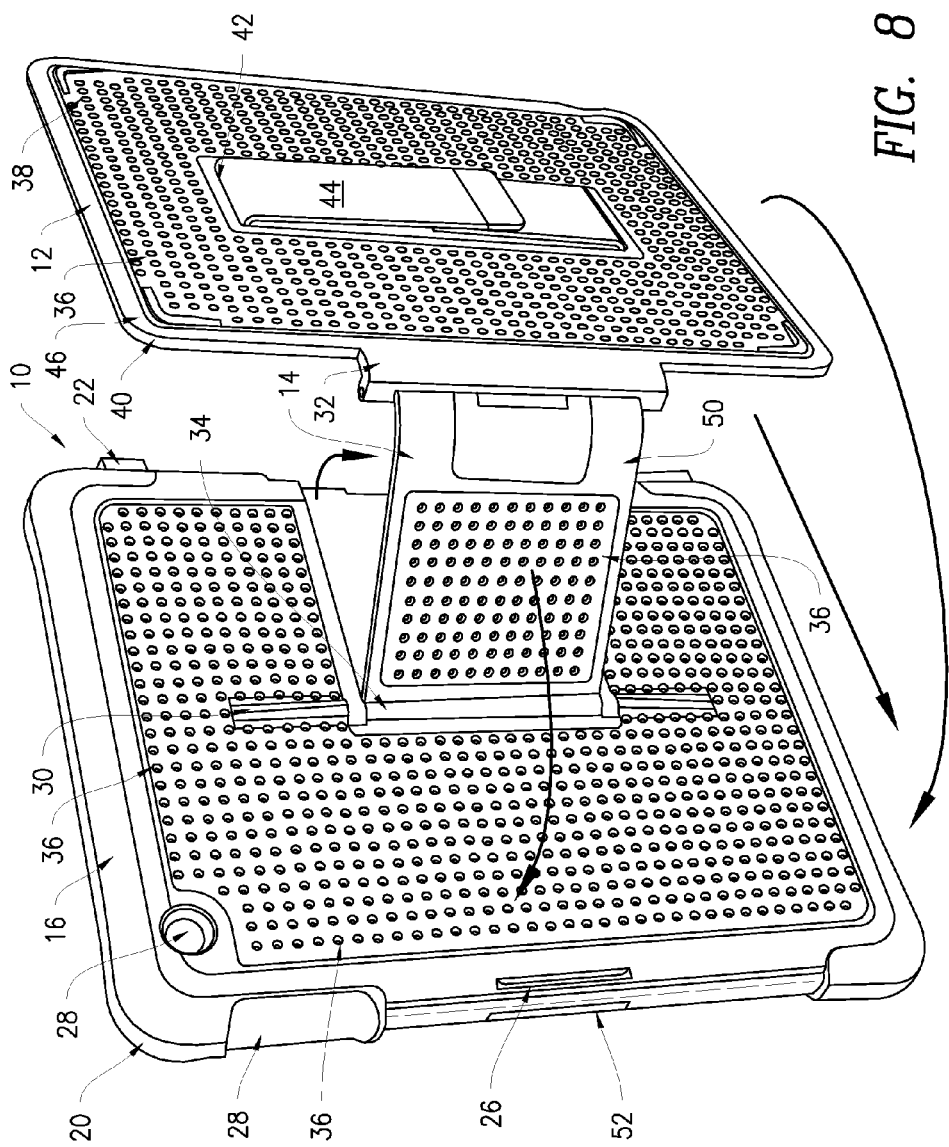
FIG. 8 is a rear perspective view of a mobile electronic device protective case.

Now referring to FIGS. 8-10, where the case can be seen transitioning from the closed position to the upright seated position, the locking latch 52 has been disengaged and released from the recessed edge 26 of the first planar base surface 18. As shown in FIG. 8, the first at least substantially planar cover surface 38 is pivotally rotating about base 16 using a first-end link body 32 and a second-end link body 30. The dual hinge linkage 14 is shifting vertically from a substantially parallel position with the first planar base surface 18 of the second mating element 34 to an angled position. The base 16 is pivotally rotating about the second-end link body 30 until the first side of the base 16 is substantially parallel with the second planar surface of the dual hinge linkage 50. The case 10 continues to pivotally rotate such that the cover 12 is substantially perpendicular with the base 16, and the second planar surface of the dual hinge linkage 50 is substantially parallel to the first planar base surface 18. The support tabs 22 are angled toward the plurality of tracks 56 and the plurality of stops 60 during this transition. Once the user has found the preferred viewing angle, the user will simply place the support tabs 22 into the plurality of tracks 56 until the support tabs 22 are seated within the plurality of stops 60.

Now referring to FIG. 11, a view of the base sidewall portions 20 fitting into at least one of the plurality of rolling notches 68 to form a desired viewing angle can be seen. In one embodiment, the second at least substantially planar cover surface 58 is defined by a plurality of rolling notches 68. The rolling notches 68 may be molded or affixed to the second at least substantially planar cover surface 58 and may be at least partially composed of the first material. Further, the dimensions of the plurality of rolling notches 68 may be at least substantially commensurate to the width of the plurality of cover sidewall portions 40 and may form a sealed male-female coupling when the case 10 is in the upright seated position.

FIG. 12 is a view showing the mobile electronic device case 10 moving into the closed position. As shown in FIG. 12, the base 16 rotates toward the second at least substantially planar cover surface 58 until the surface of the mobile electronic device 54 is lying horizontally on top of the second at least substantially planar cover surface 58 allowing the locking latch 52 to secure to the recessed edge 26. The stops 60 may be molded to or affixed within the plurality of tracks 56 or may be made out of the first material of the second at least substantially planar cover surface 58.

Figure 13:
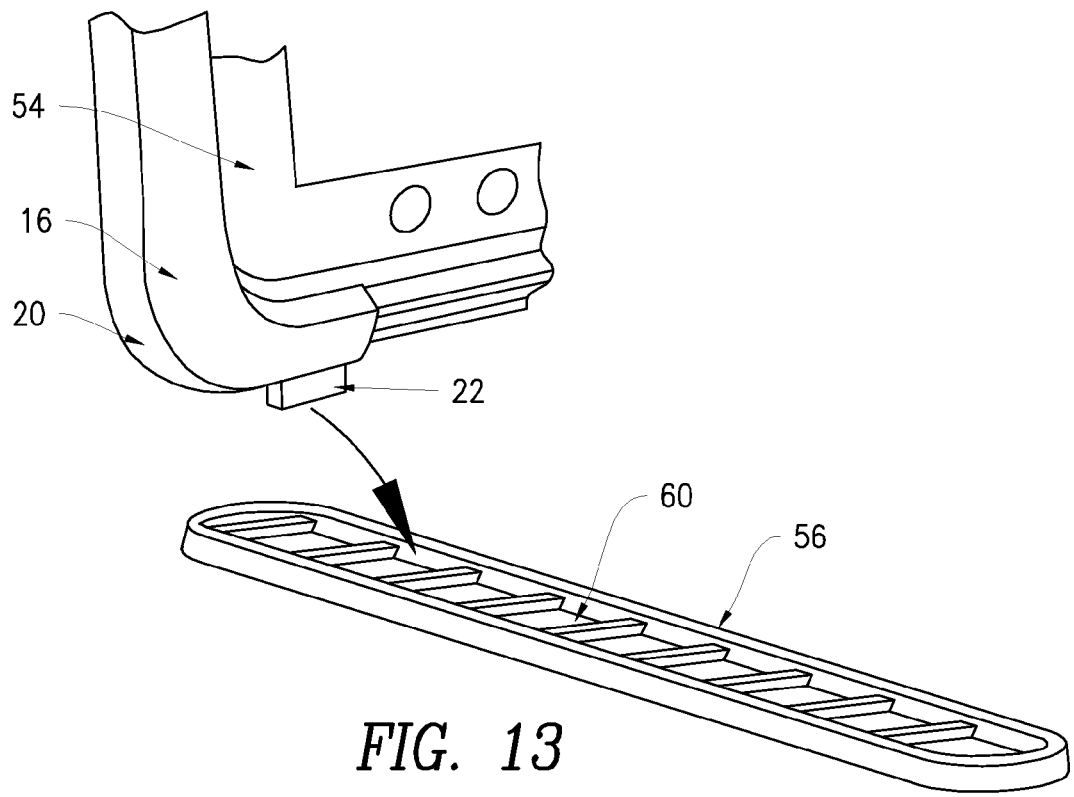
FIG. 13 is a detailed view of the stops in FIG. 12.

Now referring to FIG. 13, a detailed view of exemplary stops 60 are shown. The stops 60 may be substantially molded or affixed to the plurality of tracks 56. The plurality of tracks 56 may be molded as a part of the cover 12. Also, he support tabs 22 fit into the stops 60 located within the plurality of tracks 56. The stops 60 may be composed of the first material, or alternatively may be at least partially composed of polyurethane or another foam-like material that may provide shock absorption.

Figure 14:
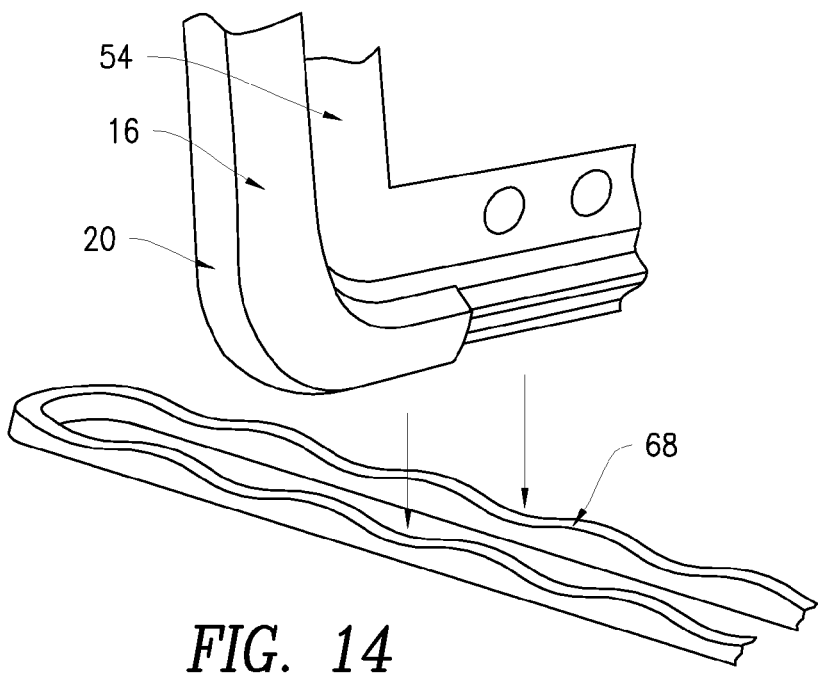
FIG. 14 is a detailed view of the rolling notches in FIG. 11.

Now referring to FIG. 14, the rolling notches 68 may be molded or affixed to the second at least substantially planar cover surface 58 and composed of the first material. The dimensions of the rolling notches 68 may be substantially commensurate with the width of the plurality of second base sidewall portions 20. The rolling notches 68 and the base 16 may form a male-female coupling to prevent shock absorption to the case 10 in the second upright seated position. The base sidewall portions 20 of the base 16 may be placed in the rolling notch 68 so that the case 10 is secure and the mobile electronic device 54 can be viewed at various angles. The cover 12 may be configured to releasbly retain the base 16 in the upright seated position by at least one of the plurality of rolling notches 68.

Figure 15:
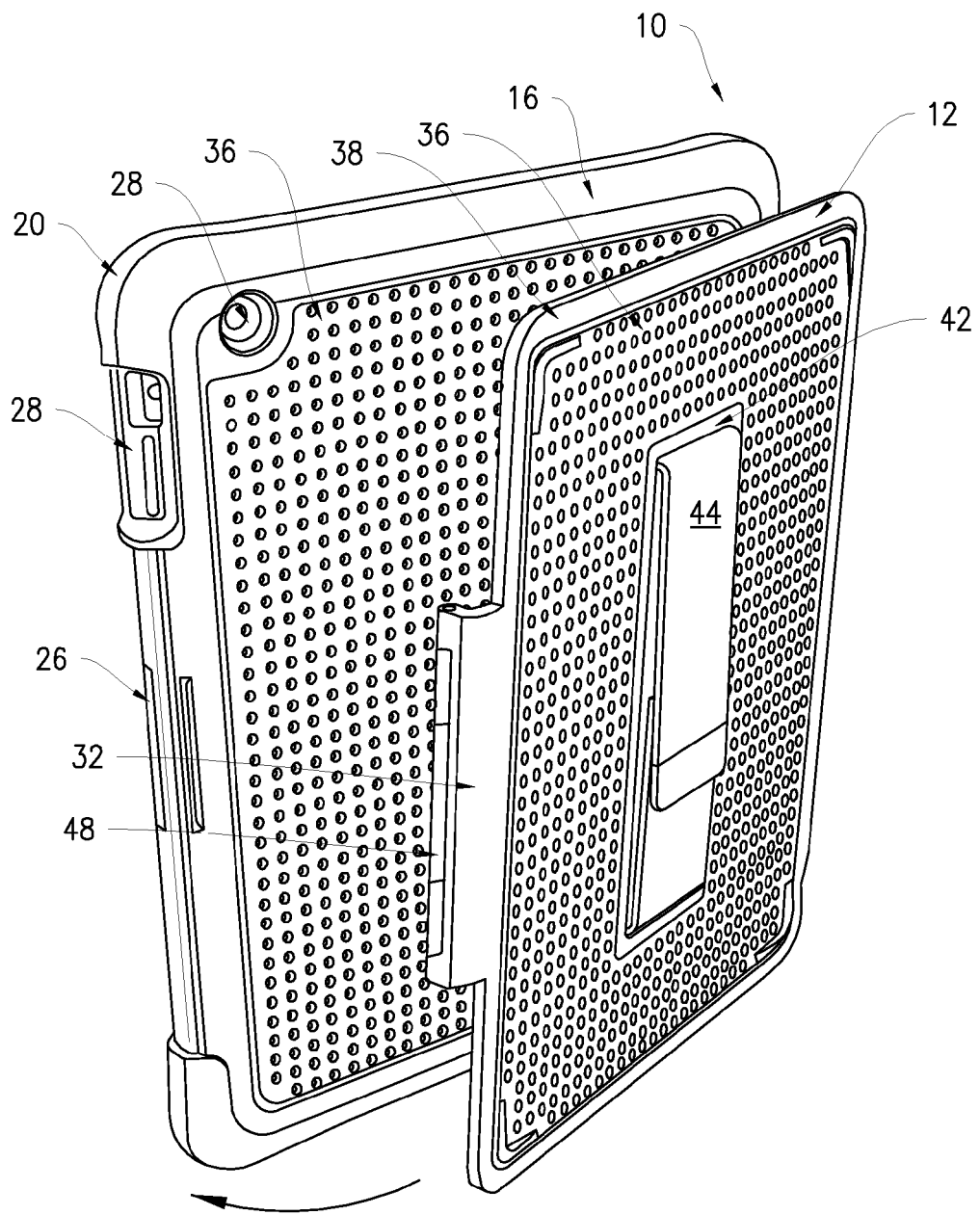
FIG. 15 is a rear perspective view of the mobile electronic device protective case transitioning into the hand-held carry position.

The transitioning of the base 16 and the cover 12 into the hand-held carry position is shown in FIG. 15. The cover 12 is pivotally rotated toward the second planar base surface 62 about the first-end link body 32 until releasably engaged to the first-end link body 32 to secure the case 10 in the third hand-held carry position.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A case for holding a mobile electronic device, the case comprising:
   a base configured to releasably retain the mobile electronic device;
   a cover; and
   a dual hinge linkage, the dual hinge linkage having a first-end link body pivotably coupled to the base and a second-end link body pivotably coupled to the cover, the dual hinge linkage configured to allow movement of the base with respect to the cover between a closed position, an upright seated position, and a hand-held carry position.

2. The case of claim 1, wherein the cover has a first at least substantially planar cover surface, and wherein the case further includes an adjustable strap, the adjustable strap being affixed to the first at least substantially planar cover surface, the adjustable strap being accessible when the case is in the hand-held carry position.

3. The case of claim 2, wherein the adjustable strap has an adjustable fastener.

4. The case of claim 1, wherein the cover has a second at least substantially planar cover surface opposite the first at least substantially planar cover surface, the cover further including a plurality of stops on the second at least substantially planar cover surface, the cover being configured to releasably retain the base in the upright seated position by at least one of the plurality of stops.

5. The case of claim 4, wherein two adjacent stops of the plurality of stops define a slot there between, and wherein the plurality of stops are arranged in two substantially parallel and spaced apart tracks, the cover being configured to releasably retain the base in the upright seated position within at least one stop on a first track of the spaced apart tracks and within at least one stop on a second track of the spaced apart tracks.

6. The case of claim 4, wherein the cover further includes a plurality of rolling notches on the second at least substantially planar cover surface, the cover being configured to releasably retain the base in the upright seated position by at least one of the plurality of rolling notches.

7. The case of claim 1, wherein:
the base has a substantially linear base sidewall portion, and the base includes at least one recessed edge; and
the substantially linear base sidewall portion has a locking latch to engage the recessed edge when the case is shown in the closed position.

8. The case of claim 1, wherein:
the dual hinge linkage has a second mating element; and
the second mating element of the dual hinge linkage is pivotally affixed at approximately a midpoint of the base.

9. The case of claim 8, where the cover includes a first-end link body and the dual hinge linkage includes a first mating element, and wherein the first mating element of the dual hinge linkage is pivotally affixed to the first-end link body.

10. A case for holding a mobile electronic device, comprising;
a cover, the cover having:
a first-end link body;
a first substantially planar cover surface;
a second substantially planar cover surface opposite the first substantially planar cover surface; and
a plurality of substantially linear cover sidewall portions defining a perimeter around the first substantially planar cover surface and the second substantially planar cover surface;
a base configured to releasably retain the mobile electronic device, the base having:
a first planar base surface opposite a second planar base surface; and
a second-end link body; and
a dual hinge linkage, the dual hinge linkage having:
a first mating element pivotally coupled to the first-end link body; and
a second mating element pivotally coupled to the second-end link body, the dual hinge linkage configured to allow movement of the base with respect to the cover to facilitate positioning of the case between a closed position, an upright seated position and a hand-held carry position.

11. The case of claim 10, wherein the dual hinge linkage has the first mating element configured to fit into the first-end link body, and the second mating element of the dual hinge linkage is configured to fit into the second-end link body, wherein the second-end link body allows pivotal rotation of the cover about the base.

12. The case of claim 11, wherein the cover has an adjustable strap affixed to the cover, the adjustable strap being accessible when the case is in the in the hand-held carry position.

13. The adjustable strap of claim 12, wherein the cover defines a recess, and the adjustable strap is mounted within the recess.

14. The case of claim 11, wherein the cover and the base are affixed to the dual hinge linkage to allow pivotal rotation into the closed position and the hand-held carry position.

15. The case of claim 11, wherein the cover is pivotally connected to the base to allow at least a 90 degree angle when the base is in the upright seated position.

16. The case of claim 15, wherein when the base is in the closed position, the base and the cover are substantially parallel to one another and securely releasably engaged to each other.

17. The case of claim 10, wherein:
at least one of the plurality of cover sidewall portions includes a locking latch;
the base has a recessed edge and an upper edge; and
the locking latch is configured to releasably engage the recessed edge in the closed position.

18. The case of claim 17, wherein the recessed edge is disposed substantially around the upper edge of the first planar base surface.

19. The case of claim 10, wherein the base further comprises at least one aperture to allow access to at least a portion of the mobile electronic device.

20. A case for holding a mobile electronic device, the case comprising:
a cover comprising:
at least one track having at least one stop; and
a first-end link body including an upper edge;
a base, the base configured to releasably retain the mobile electronic device and having a second-end link body, and the base being configured to engage with at least one stop of the cover when the base is in an upright seated position; and
a dual hinge linkage, the dual hinge linkage including:
a first mating element; and
a second mating element, the first mating element being connected to the upper edge of the first-end link body on the cover, the first mating element being pivotally coupled to the first-end link body and the second mating element being pivotally coupled to the second-end link body, the first mating element and the second mating element each being arranged to allow movement of the base with respect to the cover such that the base and the cover are transitionable between a closed position, an upright seated position, and a hand-held carry position.

* * * * *